United States Patent
Frederick et al.

(10) Patent No.: US 11,368,461 B2
(45) Date of Patent: Jun. 21, 2022

(54) APPLICATION PROGRAMMING INTERFACE AUTHORIZATION TRANSFORMATION SYSTEM

(71) Applicant: eBay Inc., San Jose, CA (US)

(72) Inventors: Gail Anna Rahn Frederick, Portland, OR (US); Tatjana Vlahovic, San Jose, CA (US)

(73) Assignee: eBay Inc., San Jose, CA (US)

( * ) Notice: Subject to any disclaimer, the term of this patent is extended or adjusted under 35 U.S.C. 154(b) by 170 days.

(21) Appl. No.: 16/588,958

(22) Filed: Sep. 30, 2019

(65) Prior Publication Data
US 2021/0099449 A1    Apr. 1, 2021

(51) Int. Cl.
*H04L 9/40*     (2022.01)
*H04W 12/084*   (2021.01)

(52) U.S. Cl.
CPC .......... *H04L 63/10* (2013.01); *H04L 63/0815* (2013.01); *H04W 12/084* (2021.01)

(58) Field of Classification Search
CPC ... H04L 63/10; H04L 63/0815; H04W 12/084
See application file for complete search history.

(56) References Cited

U.S. PATENT DOCUMENTS

| | | | |
|---|---|---|---|
| 9,088,564 B1 | 7/2015 | Hobson et al. | |
| 2011/0277027 A1* | 11/2011 | Hayton | G06F 21/554 726/8 |
| 2014/0082715 A1* | 3/2014 | Grajek | H04W 12/068 726/8 |
| 2014/0181944 A1 | 6/2014 | Ahmed et al. | |
| 2017/0264611 A1* | 9/2017 | Alen | H04L 63/0884 |
| 2017/0331832 A1* | 11/2017 | Lander | H04L 63/102 |

* cited by examiner

*Primary Examiner* — Ashokkumar B Patel
*Assistant Examiner* — William B Jones
(74) *Attorney, Agent, or Firm* — Shook, Hardy & Bacon L.L.P.

(57) ABSTRACT

Systems and methods for transforming an API authorization to a UX session are provided. An authorization server receives, from a third-party application developed by a third-party, a request to access a user experience (UX) session on behalf of a user. The request comprises an access token previously granted by the authorization server to the third-party application in response to consent, by the user, to allow the third-party application to perform actions on behalf of the user. In one embodiment, this previous authorization comprises an Open Authorization (OAuth). In response to receiving the request the authorization server transforms the access token into a single sign on (SSO) link with a session token. The authorization server then returns the SSO link that includes the session token the third-party application hosted by the third-party. The SSO link causes the third-party application to redirect the user to the UX session corresponding to the SSO link.

20 Claims, 8 Drawing Sheets

US 11,368,461 B2

APPLICATION PROGRAMMING INTERFACE AUTHORIZATION TRANSFORMATION SYSTEM

TECHNICAL FIELD

The subject matter disclosed herein generally relates to machines configured to authorize access to a network system, and to technologies by which such special-purpose machines become improved compared to other machines that authorize access to a network system. Specifically, the present disclosure addresses systems and methods to transform an API authorization to access a UX session or obtain a response from an internal service of the network system.

BACKGROUND

Conventionally, a third-party developer has access to public application programming interfaces (APIs) of a network system. Typically, the third-party developer builds a user interface (e.g., a third-party application) on their side by leveraging the public APIs. However, in some cases, the third-party application requires experience capabilities that exist on the network system.

A user of the third-party application logs into the network system through the third-party software tool (e.g., third-party application) and is granted an Open Authorization (OAuth) token that authorizes the third-party application to call a network system API on behalf of the user. When the user wants to access a service/function that is not supported by the third-party application, the user is typically redirected to the network system where the user is requested to log in again to access a page at the network system hosting the service/function.

BRIEF DESCRIPTION OF DRAWINGS

Various ones of the appended drawings merely illustrate example embodiments of the present invention and cannot be considered as limiting its scope.

DETAILED DESCRIPTION

Figure 1:
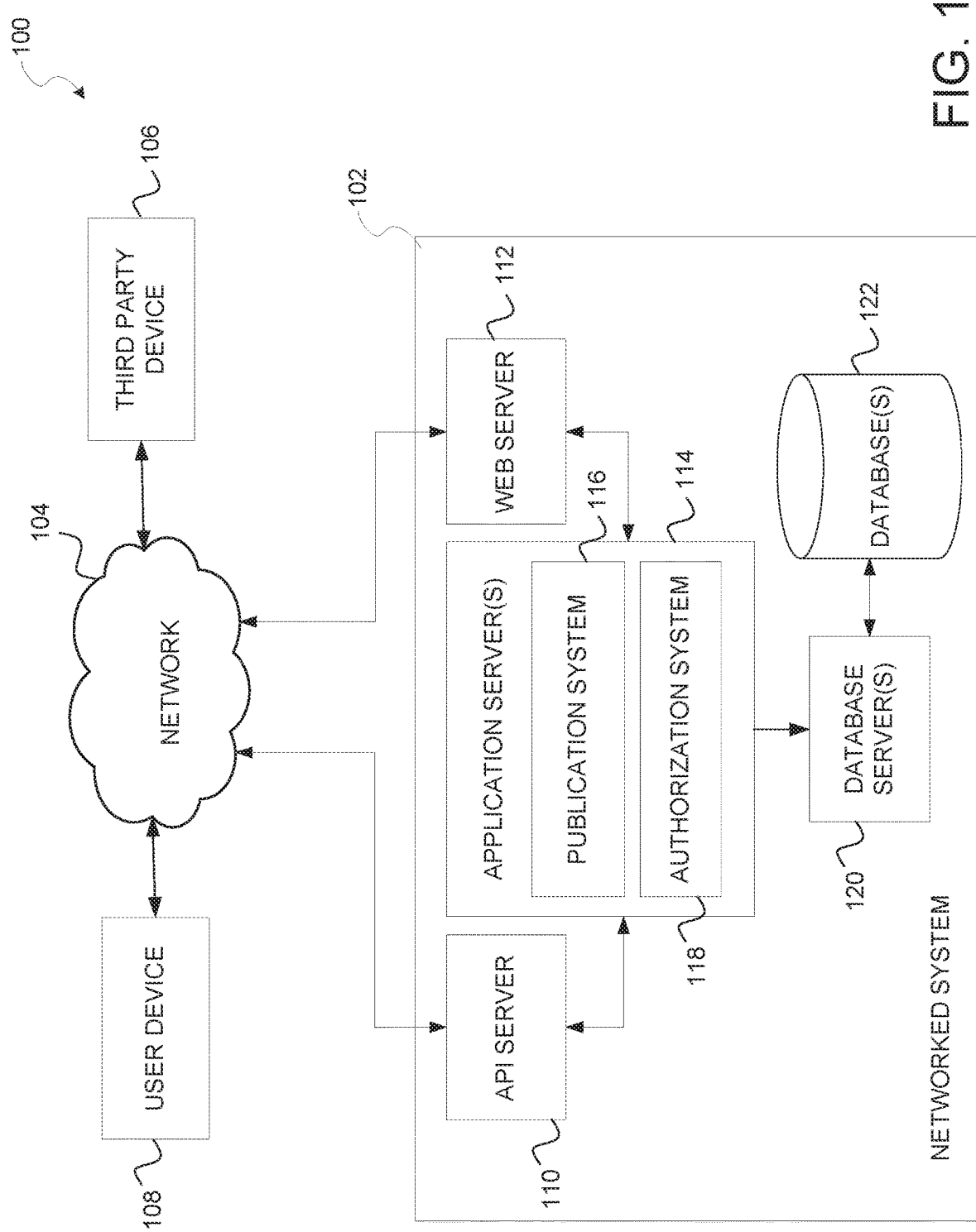
FIG. 1 is a diagram illustrating a network environment suitable for providing a system for transforming an API authorization to access functionalities or services of a network system without a second sign on, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A network system provides public APIs to third-party developers who typically build user interfaces on their side by leveraging the public APIs. However, in some cases, capabilities that exist on the network system are required. For example, a catalog API can enable a third-party application developed by the third-party developers to search a catalog of the network system to obtain product data. If there is a suggestion for an update to the catalog, a user may be redirected from the third-party application (e.g., third-party experience) to an experience of the network system. The user signs in with the network system and go through an authorization flow to grant the third-party application access to the user's data. This enables the third-party application to invoke APIs on behalf of the user. For capabilities that are part of the network system experience that are available to the user after the redirect from the third-party application, ideally frictionless single sign on (SSO) and an established session on the network system side is in place, whereby permissions granted during the authorization flow are mapped to permissions that control access during the session.

In some embodiments, an internal service needs to be accessed to elicit a response. The public APIs are orchestrators that construct responses by leveraging fine-grained internal capabilities. Such microservices have their own authorization scheme such that public APIs should be properly authorized when invoking internal services. As such, once these APIs are authorized, the permissions granted during the authorization flow are mapped to internal service permissions encapsulated within an internal access token that is presented to the internal service. A subsequent response from the internal service is provided that conforms to those internal service permissions.

As a result, the present disclosure provides two technical solutions to a technical problem of how to transform authorization granted in one namespace "realm" to another realm. An authorization realm, in example embodiments, is a group of permissions that control authorization to a group of resources and capabilities at the network system. Example embodiments use standard Open Authorization (OAuth) 2.0 protocol to authorize access to resources in two separate realms—1) public APIs (e.g., called by authorized second and third-party developers) and 2) internal web services (e.g., called by network system owned applications). In some embodiments, the API authorization is transformed to authorization to access a user experience (UX) session, while in other embodiments, the API authorization is transformed to authorization to access an internal service to elicit a response.

Accordingly, some example embodiments are directed to a network system that manages access to a user experience (UX) session at the network system that does not require a user to have to perform a second sign in with the network system. In order to provide a frictionless experience, example embodiments leverage an initial login performed by the user and facilitated by a third-party application to bypass the second sign in by the user when the user desires to access the UX session (e.g., functionalities of the network system) not available through the third-party application. In example embodiments, the initial login is an Open Authorization (OAuth) process whereby the user signs in and provides consent for the third-party application to call the network system API on behalf of the user.

In these embodiments, a SSO link to authenticate and redirect the user is used to access the UX session. Accordingly, once the user has authorized the third party application to call the network system API on the user's behalf using the OAuth process, the third-party application is granted an access token (also referred to as an "OAuth token") that includes permissions of the user. If the user needs to access a service of the network system not supported by the third-party application, the third-party application exchanges, with an authorization server associated with the network system, the access token for the SSO link. The authorization server generates and sends the SSO link that includes a session token back to the third-party application. The third-party application then redirects the user to the UX session using the SSO link that includes the session token.

The UX session accessed by the user is determined based on permissions of the user originally found in the access token. The permissions in the access token are mapped to permission settings of the UX session by the authorization server, such that the UX session presented to the user only provides services that the user and the third-party application has permission to access. Thus, the transformation in these embodiments is of an API authorization to the UX session without requiring a second sign on by the user.

In alternative embodiments, the transformation is of an authorization granted in one realm to another realm in order to obtain an internal service response. In these embodiments, the OAuth token along with an API request is received by an API from the third-party application. The API determines that an internal service needs to be accessed in order to respond to the API request. As such, the API exchanges, with the authorization system, the OAuth token for an internal access token that has mapped permissions obtained from the OAuth token. The internal access token is then transmitted along with an internal service request to the internal service, which responds within the permissions of the internal access token. The response is then formatted and returned to the third-party application as an API response.

As an example, Alice is a seller on a network system and Bob is a developer who provides multi-channel selling tool. Alice is Bob's customer. Bob's software tool (e.g., third-party application) integrates with a catalog API of the network system and allows Alice to search products and view product details. When Alice logs into her network system account through Bob's software tool, she is granted an OAuth token in the public API "realm" that authorizes Bob's software tool to call the catalog API on her behalf. Bob's experience does not support product changes. As such, when Alice wants to suggest updates to the product catalog, Bob's software tool redirects the flow to the network system. To avoid requesting Alice to log-in again, and to enable as much frictionless experience as possible, Bob's software tool integrates with authorization services of the network system to exchange Alice's OAuth token for an SSO link. This SSO link comprises the information needed to establish the session and let Alice navigate through the network system UX to submit her catalog change request. Once done, Alice is redirected back to Bob's software tool and continues to manage her inventory.

Accordingly, the present disclosure provides technical solutions to the technical problem of how to transform authorization granted in one namespace "realm" to another realm. In some embodiments, the transformation is of the API authorization to a UX session without requiring a second sign on by the user. In some embodiments, the transformation is of the API authorization to an internal access token to obtain a response from an internal service. As a result, one or more of the methodologies described herein facilitate solving technical problems associated with having to perform multiple authorization processes for access to services or functions of the network system. As a result, resources used by one or more machines, databases, or devices (e.g., within an environment) may be reduced. Examples of such computing resources include processor cycles, network traffic, memory usage, data storage capacity, power consumption, network bandwidth, and cooling capacity.

With reference to FIG. 1, an example embodiment of a network environment 100 that provides a system for transforming an API authorization to access a network system (e.g., UX session or internal services) without a second sign on is shown. A network system 102 provides server-side functionality via a communication network 104 (e.g., the Internet, wireless network, cellular network, or a Wide Area Network (WAN)) to a plurality of user devices including a third-party device 106 and a user device 108.

The third-party device 106 and user device 108 interface with the networked system 102 via a connection with the network 104. Depending on the form of each of the third-party device 106 and user device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with the user device 108 executing a web client (e.g., an Internet browser), which may be in communication with the network system 102. The UIs may also be associated with one or more third-party applications provided by the third-party device 106 (e.g., a third-party application or operating system designed by a developer for interacting with the network system 102).

The user device 108 may comprise, but is not limited to, a smartphone, tablet, laptop, multi-processor systems, microprocessor-based or programmable consumer electronics, game consoles, set-top boxes, a server, or any other communication device that a user may utilize to access the network system 102. In some embodiments, the user device 108 comprises a display module (not shown) to display information (e.g., in the form of user interfaces). In further embodiments, the user device 108 comprises one or more of a touch screen, accelerometer, camera, microphone, and Global Positioning System (GPS) device.

The user device 108 may include one or more applications (also referred to as "apps") such as, but not limited to, a web browser, messaging application, electronic mail (email) application, an e-commerce site application (also referred to as a marketplace application), third-party applications, and the like. In some embodiments, if a site application (e.g., the e-commerce site application) is included in the user device 108, then this application is configured to locally provide the user interface and at least some of the functionalities with the application configured to communicate with the network system 102, on an as needed basis, for data or processing capabilities not locally available (e.g., access to a database of published items, to authenticate a user, to verify a method of payment, to negotiate an offer with multiple sellers). Conversely if the site application is not included in the user device 108, the user device 108 may use its web browser to access site (or a variant thereof) hosted on the network system 102. Further still, the user device 108 may provide authorization for a third-party application to make API calls on behalf of the user of the user device 108.

Turning specifically to the network system 102, an application program interface (API) server 110 and a web server 112 are coupled to, and provide programmatic and web interfaces respectively to, one or more application servers 114. The application servers 114 host a publication system 116 and an authorization system 118, each of which may comprise one or more modules, applications, or engines, and which can be embodied as hardware, software, firmware, or any combination thereof. The application servers 114 are, in turn, coupled to one or more database servers 120 that facilitate access to one or more information storage repositories or databases 122. In one embodiment, the database 122 is a storage device that stores content (e.g., publications or item listings, store information, buyer profiles including past browsing and purchase history, seller profiles) that is used by the network system 102.

In example embodiments, the publication system 116 publishes content on a network (e.g., Internet). As such, the publication system 116 provides a number of publication functions and services to users that access the network system 102. For example, the publication system 116 can host a marketplace application that provides a number of marketplace functions and services to users, such as publishing, listing, and price-setting mechanisms whereby a seller may list (or publish information concerning) goods or services (also collectively referred to as "items") for sale, a potential user or buyer can express interest in or indicate a desire to purchase such goods or services, and a transaction pertaining to the goods or services is processed. However, it is noted that the publication system 116 may, in alternative embodiments, be associated with a non-marketplace environment such as an informational environment (e.g., search engine) or social networking environment.

The authorization system 118 comprises one or more authorization servers that participates in an Open Authorization (OAuth) process to initially authorize a third-party application to make API calls on behalf of the user. The authorization system 118 subsequently transforms an access token generated during the OAuth process to a single sign on (SSO) link to access a UX session of the network system 102 in accordance with some embodiments. In other embodiments, the authorization system 118 transforms the access token generated during the OAuth process to an internal access token in order to obtain an internal service response from the network system 102. The authorization system 118 will be discussed in more detail in connection with FIG. 2.

While the publication system 116 and authorization system 118 are shown in FIG. 1 to form part of the network system 102, it will be appreciated that, in alternative embodiments, the publication system 116 or authorization system 118 may form part of a separate service that is distinct from the network system 102. Furthermore, while the client-server-based network environment 100 shown in FIG. 1 employs a client-server architecture, the present inventive subject matter is of course not limited to such an architecture and could equally well find application in a distributed or peer-to-peer architecture system, for example. The publication system 116 and authorization system 118 can also be implemented as standalone software programs, which do not necessarily have networking capabilities.

In example embodiments, any of the systems, servers, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems, servers, or devices illustrated in FIG. 1 may be combined into a single system, server, or device, and the functions described herein for any single system, server, or device may be subdivided among multiple systems or devices. Additionally, any number of network systems 102, third-party devices 106, and user devices 108, may be embodied within the network environment 100. Furthermore, some components or functions of the network environment 100 may be combined or located elsewhere in the network environment 100.

Figure 2:
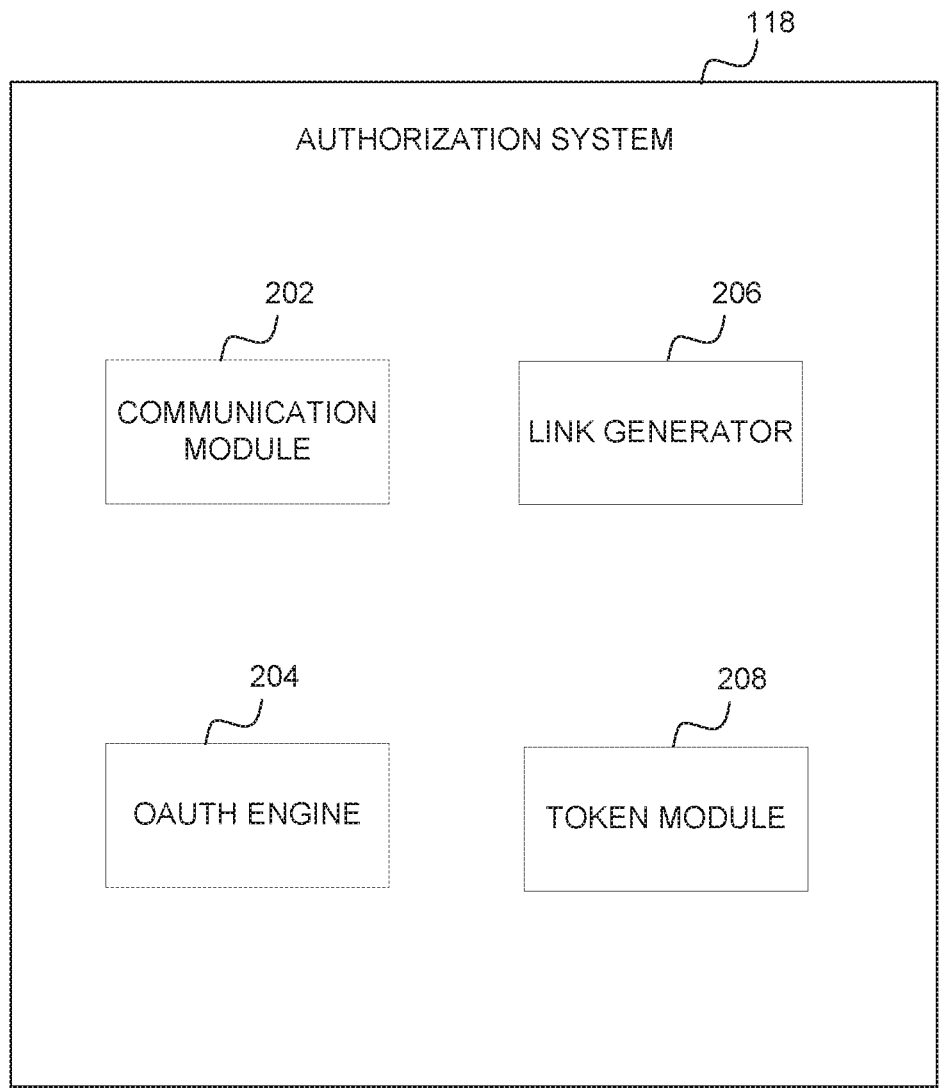
FIG. 2 is a block diagram illustrating components of the authorization system, according to some example embodiments.

FIG. 2 is a block diagram illustrating components of the authorization system 118, according to some example embodiments. In example embodiments, the authorization system 118 comprises one or more authorization servers that include components that manages authentication of a user, API authorization of a third-party application to make API calls on behalf of the user, and transformation of the API authorization across authorization realms by mapping permissions from the API realm to internal realms internal services, UX) without requiring a second sign on by the user. To enable these operations, the authorization system 118 comprises a communications module 202, a OAuth engine 204, link generator 206, and a token module 208 all configured to communicate with each other (e.g., via a bus, shared memory, or a switch). The authorization system 118 may also comprise other components (not shown) that are not pertinent to example embodiments. Furthermore, any one or more of the components (e.g., engines, modules, generators) described herein may be implemented using hardware (e.g., a processor of a machine) or a combination of hardware and software. Moreover, any two or more of these components may be combined into a single component, and the functions described herein for a single component may be subdivided among multiple components.

The communications module 202 manages exchange of communications with the third-party application (e.g., provided by the third-party device 106 and operating on the user device 108). Specifically, the communications module 202 exchanges information with the third-party application during an authorization code flow to generate an API authorization (e.g., an access token associated with the user) that allows the third-party application to make API calls on behalf of the user. In example embodiments, the third-party application sends the user through a standard authorization code flow where the user is granted an access token. In example embodiments, the standard authorization code flow is the standard three-legged Open Authorization (OAuth) flow and the access token is an OAuth token.

The communications module 202 also receives a request to transform the API authorization (e.g., the access token) for authorization to access services or functionalities of the network system 102 (e.g., a UX session or internal services of the network system 102). In some embodiments, the communication module 202 works with the other components of the authorization system 118 to return a single sign-on (SSO) link that allows the user (e.g., at the user device 108) to access the UX session of the network system 102 without requiring the user to sign on a second time. In other embodiments, the communication module 202 works with the other components of the authorization system 118 to transform an authorization scope across authorization realms in order to return a response from an internal service of the network system 102.

The OAuth engine 204 is configured to perform the OAuth flow. In example embodiments, the OAuth engine 204 receives the authorization code request (e.g., via the communication module 202). The OAuth engine 204 also receives a sign in (e.g., a user credentials and password or PIN) and consent for the authorization from the user at the user device 108 via the third-party application. During the OAuth flow, the OAuth engine 204 generates the access token after the user signs in with their credentials. Ideally, this sign in (also referred to herein as a "sign on") is the only time a user will be required to sign in with the network system 102. The token generated by the OAuth engine 204 comprises embedded permissions that define resources to be accessed and operations performable on the resources for the user (by the third-party application) at the network system 102. The OAuth flow will be discussed in more detail in connection with FIG. 3.

The link generator 206 is configured to generate the SSO link. In example embodiments, the authorization system 118 receives, via the communication module 302 a request to exchange the access token obtained during the OAuth flow for the SSO link. The link generator 206 generates the SSO link and, in doing so, maps the embedded permissions associated with the access token to UX permissions encapsulated within a session token. A subsequent UX session provides access to a user interface or a service authorized by these UX permissions. The session token is then included in the SSO link and transmitted to the third-party application by the communication module 202. In one embodiment, the SSO link is a SSO Uniform Resource Locator (URL). Using the SSO link, the third-party application redirects the user to the UX session of the network system 102.

The token module 208 is configured to manage exchange of tokens with an API in order to transform the authorization scope across authorization realms into an internal access token. In example embodiments, the token module 208 receives an access token from an API with a request to exchange the access token for an internal access token. In response, the token module 208 grants an internal access token to the API. In example embodiments, the token module 208 generates the internal access token by encapsulating permissions from the access token into the internal access token. The internal access token can then be used by the API to access an internal service by sending an internal service request with the internal access token to the internal service.

Figure 3:
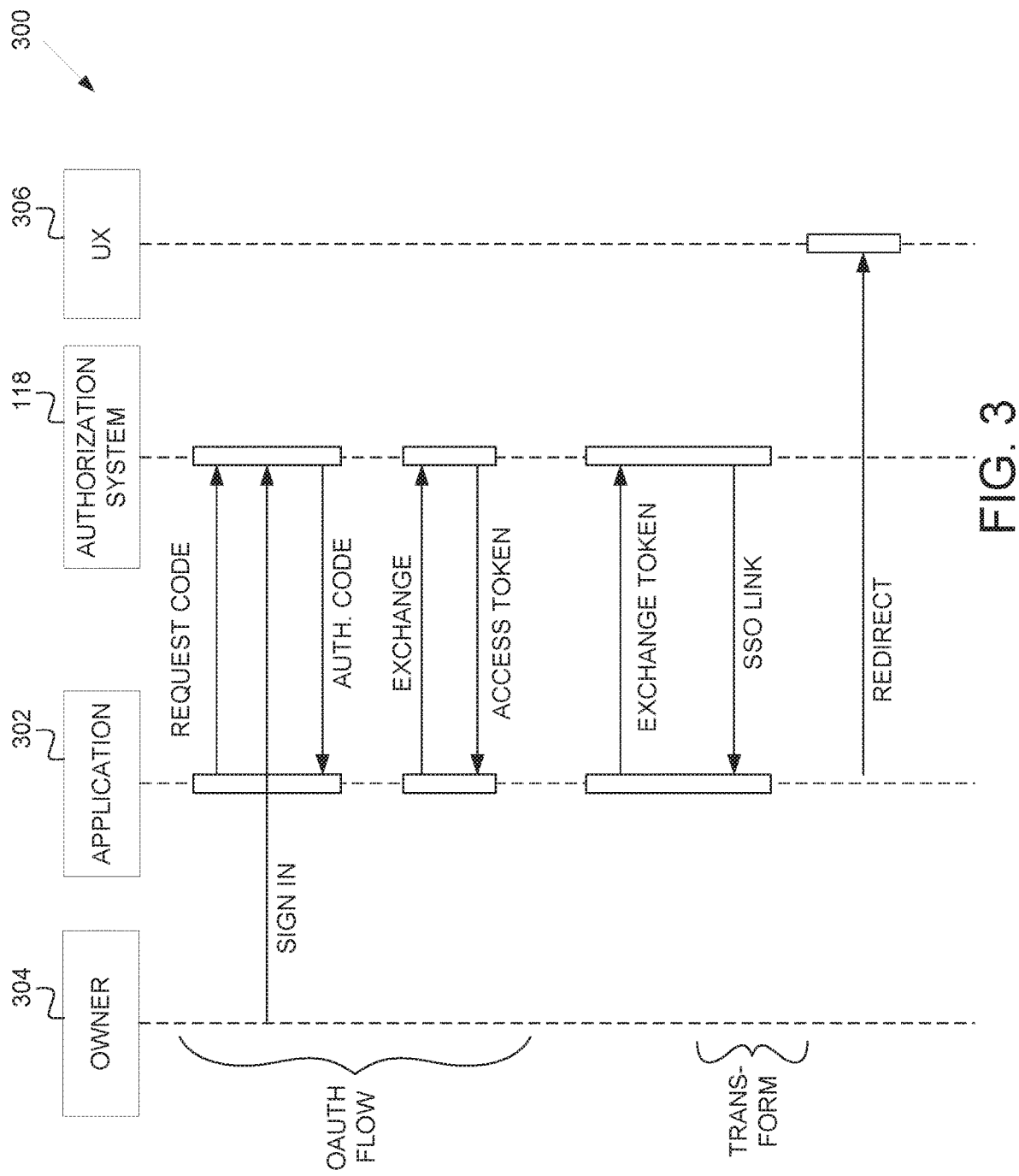
FIG. 3 is a diagram illustrating a communication flow for obtaining API authorization and using the API authorization to access a UX session, according to some example embodiments.

FIG. 3 is a diagram illustrating a communication flow 300 for obtaining API authorization and using the API authorization to access a UX session 306 without requiring the user to perform another sign on with the network system 102, according to some example embodiments. Initially, the API authorization (and API access token) is granted to a third-party application 302. Subsequently, the API authorization is exchanged, by the third-party application, for access to the UX session 306 of the network system 102 without requiring user input (e.g., second user sign in or request for UX permissions).

In example embodiments, the API authorization comprises a standard 3-legged OAuth flow. As shown in FIG. 3, the OAuth flow starts with a request, from the third-party application to the authorization system 118, for an authorization code. A resource owner 304 (e.g., a user of the user device 108) provides a sign in and consent for the third-party application 302 to make API calls on behalf of the resource own. For example, a credential user interface with fields for the resource owner 304 to provide credentials such as username, password, or PIN is displayed to the resource owner 304 on the user device 108. The resource owner 304, by providing the credential, inherently or explicitly provides the consent for the third-party application 302 to make API calls on behalf of the resource owner 304.

Once the authorization system 118 receives the sign in and consent, the authorization system 118 may verify (e.g., authenticate) the resource owner 304. The authorization system 118 then generates an authorization code and returns the authorization code to the third-party application 302.

Subsequently, the third-party application 302 exchanges the authorization code for an access token. Accordingly, the third-party application 302 transmits the authorization code along with a request for the access token. The authorization system 118 receives the request and authorization code and generates the access token. In example embodiments, the access token comprises embedded permissions that define resources to be accessed and operations performable on the resources for the user. In example embodiments, the access token is also referred to herein as an OAuth token.

In situations where the resource owner 304 wants to perform an operation or access information not supported by the third-party application 302, the resource owner 304 needs to be redirected to the network system 102 (e.g., the UX session 306 at the network system 102). In example embodiments, the third-party application integrates with the authorization system 118 to exchange the OAuth token for an SSO link. Accordingly, in these situations, the third-party application 302 exchanges the OAuth token for an SSO link. In example embodiments, the authorization system 118 receives, via the communication module 302, a request to exchange the OAuth token for the SSO link.

In response to receiving the exchange request, the authorization system 118 (e.g., the link generator 206) generates the SSO link and, in doing so, maps the embedded permissions associated with the access token to UX permissions encapsulated within a session token. The mapping also considers permissions granted to the third-party application (e.g., a particular third-party application may not have access to all areas of the network system 102 even if the user has that permission in the access token). The session token is then included in the SSO link and returned to the third-party application 302. In one embodiment, the SSO link is a SSO Uniform Resource Locator (URL).

The third-party application 302 redirects the resource owner 304 to the UX session 306 at the network system 102 using the SSO link. The SSO link has all the information needed to establish the UX session 306. As such, the UX session 306 provides access to a user interface or a service authorized by these UX permissions.

Figure 4:
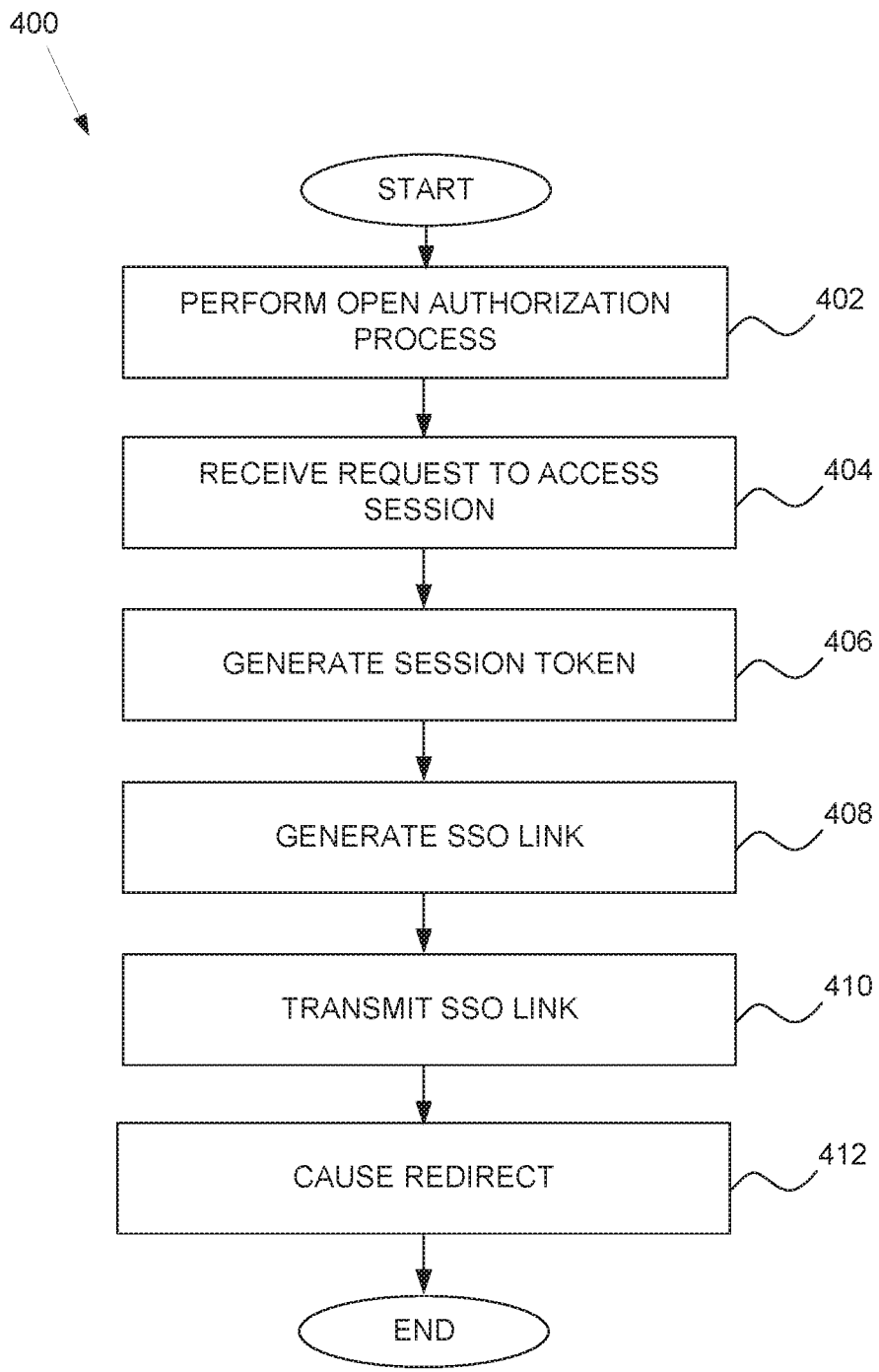
FIG. 4 is a flowchart illustrating operations of a method for transforming an API authorization to access a UX session without a second sign on, according to some example embodiments.

FIG. 4 is a flowchart illustrating operations of a method 400 for transforming an API authorization to access a UX session without requiring a second sign on by a user, according to some example embodiments. Operations in the method 400 may be performed by the authorization system 118, using components described above with respect to FIG. 2. Accordingly, the method 400 is described by way of example with reference to the authorization system 118. However, it shall be appreciated that at least some of the operations of the method 400 may be deployed on various other hardware configurations or be performed by similar components residing elsewhere in the network environment 100. Therefore, the method 400 is not intended to be limited to the authorization system 118.

In operation 402, the OAuth engine 204 performs an open authorization (OAuth) process to grant API authorization to the third-party application 302 to make API calls on behalf of a user. In example embodiments, the OAuth engine 204 receives an authorization code request (e.g., via the communication module 202) and receives a sign in (e.g., a user credentials and password or PIN) and consent for the authorization from the user at the user device 108 via the third-party application. In some embodiments, the OAuth engine 204 generates and returns an authorization code to the third-party application 302, which is subsequently exchanged by the third-party application 302 for an access token or OAuth token. In some embodiments, the OAuth engine 204 generates the access token that embeds permissions that define resources to be accessed and operations performable on the resources by the user.

When a user (e.g., resource owner 304) wants to perform an operation or access information not supported by the third-party application 302, the user needs to be redirected to the network system 102 (e.g., a UX session at the network system 102). In example embodiments, the third-party application 302 integrates with the authorization system 118 to exchange the access token for a single sign on (SSO) link. In operation 404, the authorization system 118 receives a request to access a session at the network system 102. The request includes the OAuth token.

In operation 406, the link generator 206 generates a session token. In example embodiments, the link generator 206 maps embedded permissions associated with the access token to UX permissions and encapsulates the UX permissions in the session token.

In operation 408, the link generator 206 generates the SSO link. In example embodiments, the SSO link includes the session token with the embedded UX permissions. In one embodiment, the SSO link is a SSO Uniform Resource Locator (URL).

In operation 410, the authorization system 118 transmits the SSO link to the third-party application 302. Using the SSO link, the third-party application 302 redirects the user, in operation 412, to the network system 102 (e.g., the UX session at the network system 102). When the resource owner 304 ends the UX session 306, the network system 102 redirects the user (e.g., user device 108) back to the third-party application 302.

While example embodiments have been discussed whereby the user does not need to perform a second factor authentication in order to access the UX session, alternative embodiments may include the second factor authentication. In these alternative embodiments, the second factor authentication can be performed in addition to the API authorization to UX session transformation or in lieu of.

Figure 5:
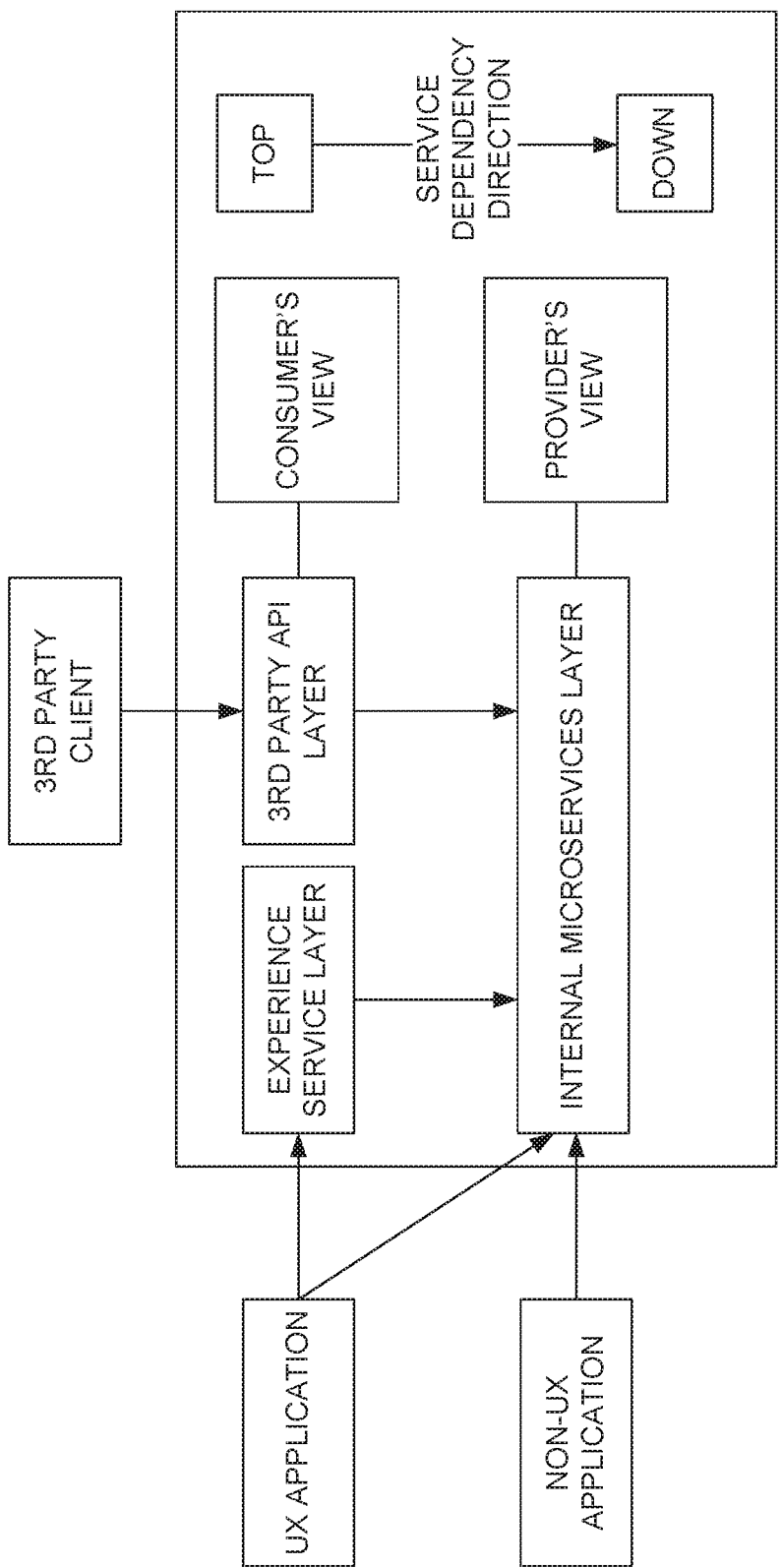
FIG. 5 is a diagram illustrating service layers in the network system.

FIG. 5 is a diagram illustrating service layers in the network system 102. Public APIs are complex orchestrators powered by a set of internal microservices (e.g., an internal microservices layer). The public APIs are a thin layer with no or less business logic incorporated and with requirements tailored to external clients. The APIs leverage internal services to construct responses.

Figure 6:
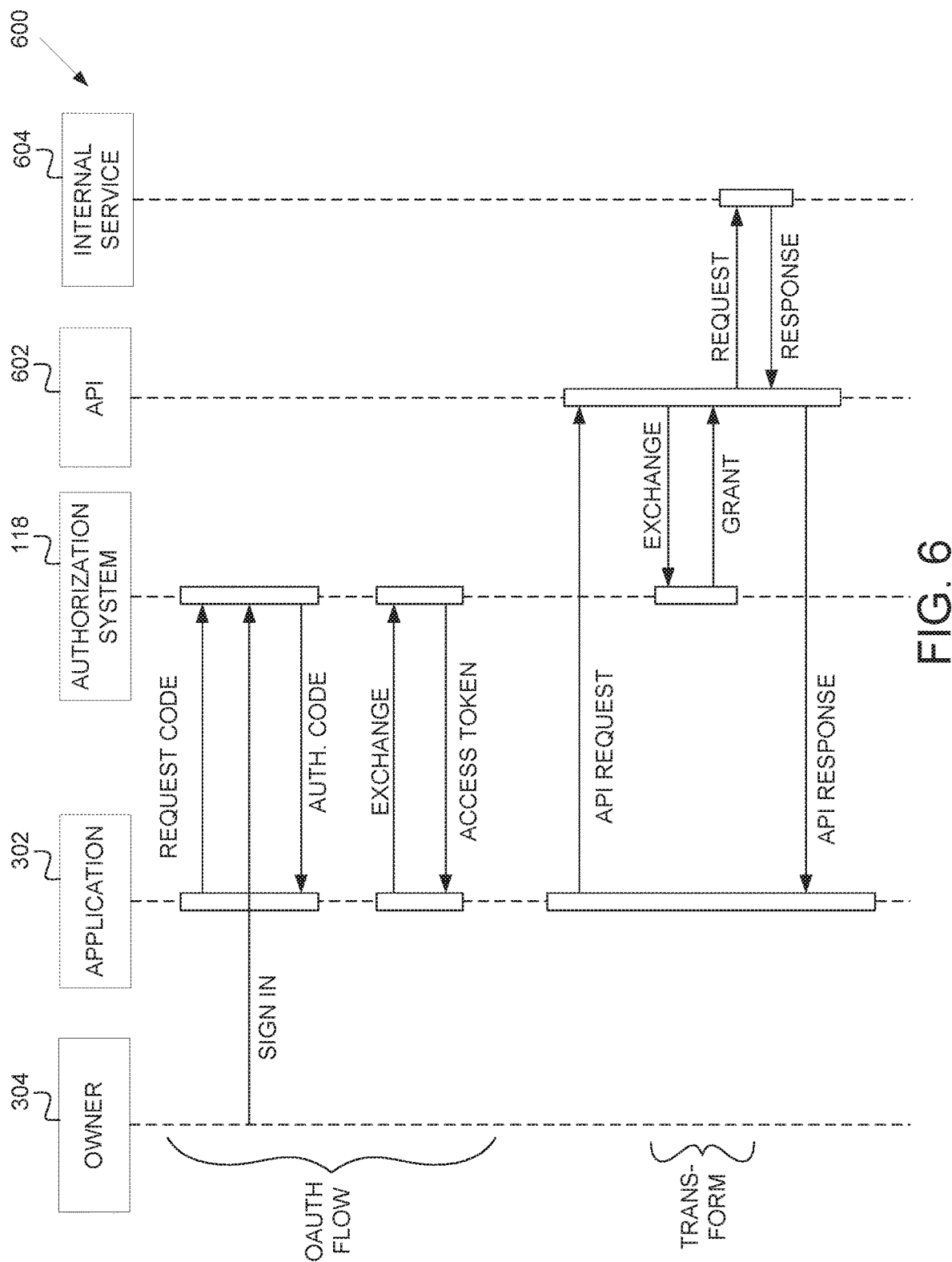
FIG. 6 is a diagram illustrating a communication flow for transforming authorization scopes across authorization realms to obtain an internal service response, according to some example embodiments.

FIG. 6 is a diagram illustrating a communication flow for transforming the authorization scopes across authorization realms to obtain an internal service response, according to some example embodiments. As with the communication flow of FIG. 3, the API authorization comprises a standard 3-legged OAuth flow. As shown in FIG. 6, the OAuth flow starts with a request, from the third-party application to the authorization system 118, for an authorization code. A resource owner 304 (e.g., a user of the user device 108) provides a sign in and consent for the third-party application 302 to make API calls on behalf of the resource own. The resource owner 304, by providing the credential, inherently or explicitly provides the consent for the third-party application 302 to make API calls on behalf of the resource owner 304.

Once the authorization system 118 receives the sign in and consent, the authorization system 118 verifies (e.g., authenticate) the resource owner 304. The authorization system 118 then generates an authorization code and returns the authorization code to the third-party application 302.

Subsequently, the third-party application 302 exchanges the authorization code for an access token. Accordingly, the third-party application 302 transmits the authorization code along with a request for the access token. The authorization system 118 receives the request and authorization code and generates the access token. In example embodiments, the access token comprises embedded permissions that define resources to be accessed and operations performable on the resources for the user. In example embodiments, the access token is also referred to herein as an OAuth token. The access token is granted to the third-party application 302.

The third-party application 302 sends an API request with the access token to an appropriate API 602. Once the API 602 receives the request, the API 602 may determine that a response is needed from an internal service 604. In these situations, the API 602 exchanges the access token in the request for an internal access token. Accordingly, the API transmits the access token along with an exchange request to the authorization system 118.

In response to receiving the exchange request, the authorization system 118 (e.g., the token module 208) generates the internal access token. In example embodiments, the token module 208 maps the embedded permissions associated with the access token to internal service permissions encapsulated within the internal access token. The mapping also considers permissions granted to the third-party application (e.g., a particular third-party application may not have access to all areas of the network system 102 even if the user has that permission in the access token).

The internal access token is returned to the API 602, which then uses the internal access token to access the internal service 604. Specifically, the API 602 send an internal service request with the internal access token to the internal service 604. The internal service 604, based on the permissions encapsulated in the internal access token, provides an appropriate internal service response to the API 602. The API 602 then relays the internal service response as an API response to the third-party application 302.

Both public APIs and internal web services use standard OAuth 2.0 protocol for authorization. For instance, the catalog API, from the above example, is powered by two internal services: Product Search and Product Detail. The third-party application 302 invokes the catalog API and passes the access token through an authorization request header. The public API (e.g., the catalog API) integrates with the authorization system 118 to exchange the access token for the internal access token with scopes from the internal web services authorization realm. The internal access token encapsulates the granted API authorization transformed to the internal microservices authorization. The catalog API obtains the response from the internal service 604, applies formatting rules consistent across public APIs, and sends the formatted response to the client (e.g., the third-party application 302).

Figure 7:
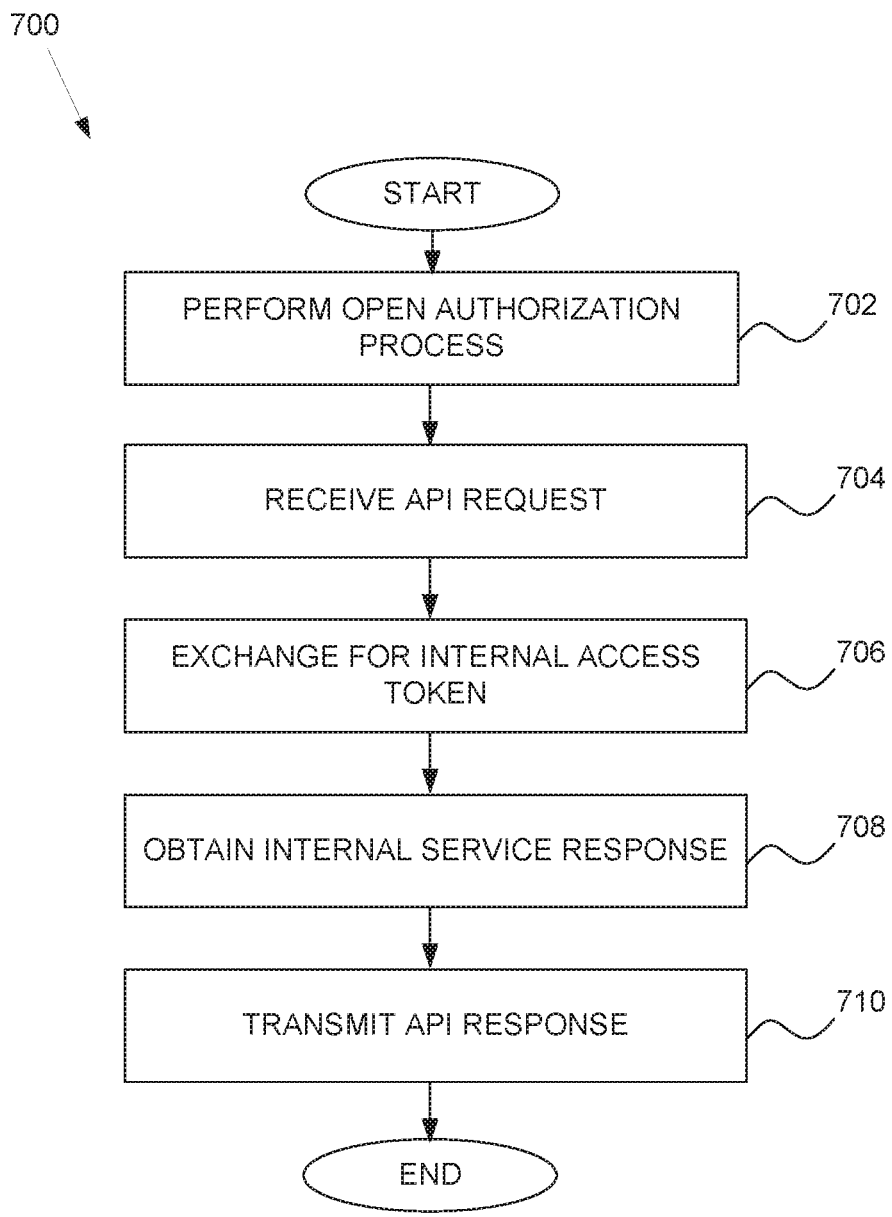
FIG. 7 is a flowchart illustrating operations of a method for transforming authorization scopes across authorization realms to obtain an internal service response, according to some example embodiments.

FIG. 7 is a flowchart illustrating operations of a method 700 for transforming an authorization scope across authorization realms to obtain a response from an internal service, according to some example embodiments. Operations in the method 700 may be performed by the network system 102, using components described above with respect to FIG. 1 and FIG. 2. Accordingly, the method 700 is described by way of example with reference to the network system 102. However, it shall be appreciated that at least some of the operations of the method 700 may be deployed on various other hardware configurations or be performed by similar components residing elsewhere in the network environment 100. Therefore, the method 700 is not intended to be limited to the network system 102.

In operation 702, the OAuth engine 204 performs an open authorization (OAuth) process to grant API authorization to the third-party application 302 to make API calls on behalf of a user. In example embodiments, the OAuth engine 204 receives an authorization code request (e.g., via the communication module 202) and receives a sign in (e.g., a user credentials and password or PIN) and consent for the authorization from the user at the user device 108 via the third-party application. In some embodiments, the OAuth engine 204 generates and returns an authorization code to the third-party application 302, which is subsequently exchanged by the third-party application 302 for an access token or OAuth token. In some embodiments, the OAuth engine 204 generates the access token that embeds permissions that define resources to be accessed and operations performable on the resources by the user.

When the third-party application 302, on behalf of the user, sends an API request with the access token to the API 602. The API 602 receives the API request in operation 704.

In some embodiments, the API 602 determines that the API 602 request requires information, operations, or functionalities of the internal service 604. Accordingly, the API 602 exchanges the access token for an internal access token in operation 706. The public API 602 integrates with the authorization system 118 to exchange the access token for the internal access token having scopes from the internal web services authorization realm. In example embodiments, the authorization system 118 (e.g., the token module 208) generates the internal access token. For instance, the token module 208 maps the embedded permissions associated with the access token to internal service permissions encapsulated within the internal access token. The mapping also considers permissions granted to the third-party application (e.g., a particular third-party application may not have access to all areas of the network system 102 even if the user has that permission in the access token). The internal access token is returned to the API 602, which then uses the internal access token to access the internal service 604.

In operation 708, the API 602 obtains an internal service response. In example embodiments, the API 602 uses the internal access token to access the internal service 604. Specifically, the API send an internal service request with the internal access token to the internal service 604. The internal service 604, based on the permissions encapsulated in the internal access token, provides an appropriate internal service response to the API 602.

In operation 710, the API 602 relays the internal service response as an API response to the third-party application 302. In some embodiments, the API 602 formats the internal service response into an appropriate API response for transmission to the third-party application 302.

While example embodiments have been discussed whereby the user does not need to perform a second factor authentication in order to access the internal service 604, alternative embodiments may include the second factor authentication.

Figure 8:
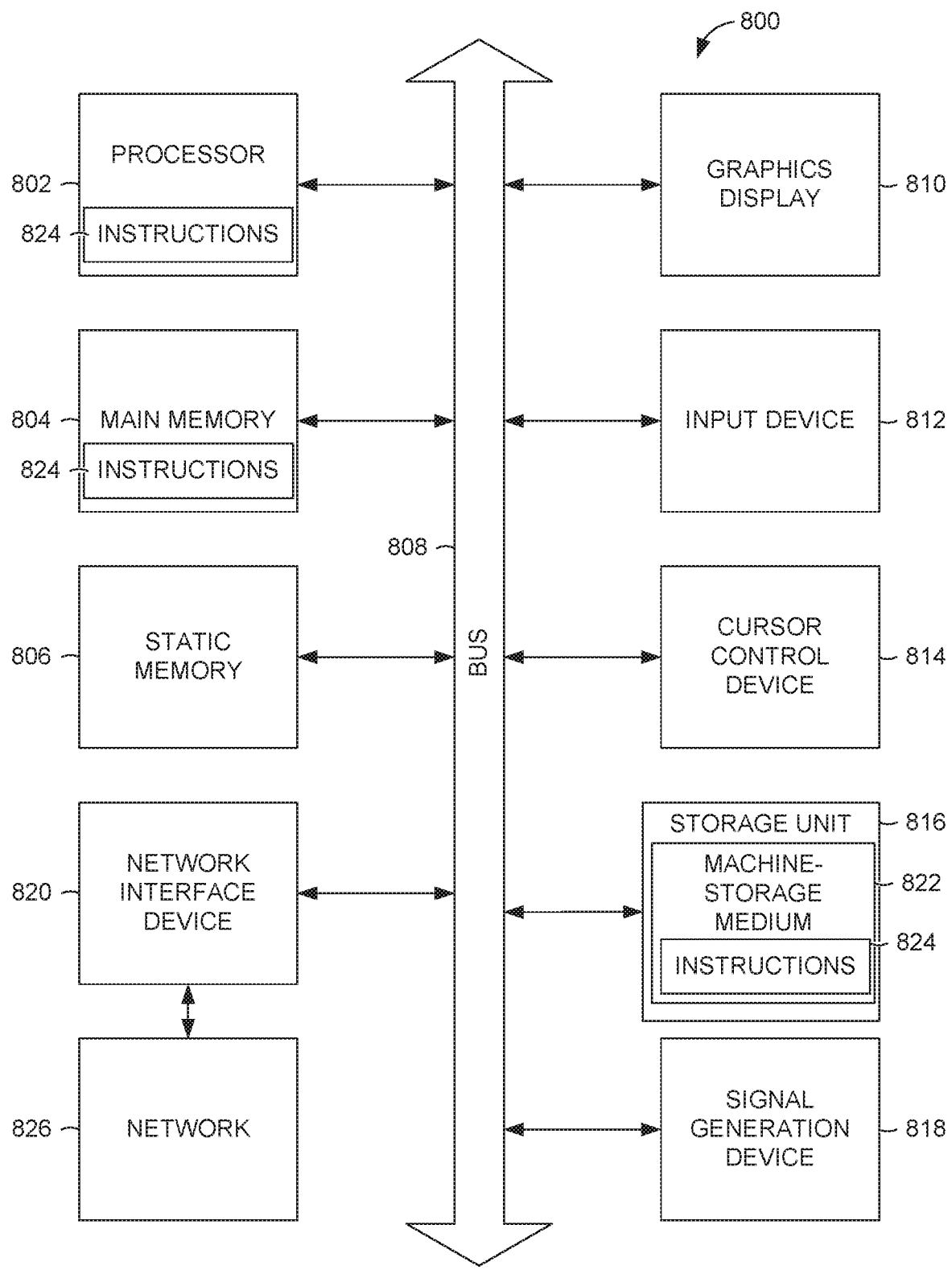
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine storage device, a non-transitory machine-readable storage medium, a computer storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the communication flow and flowchart of FIG. 3 through FIG. 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 1002 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-readable storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using the transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for transforming an API authorization to a UX session without a second user sign in. The method comprises receiving, at an authorization server from a third-party application developed by a third-party, a request to access a user experience (UX) session on behalf of a user, the request comprising an access token previously granted by the authorization server to the third-party application in response to consent, by the user, to allow the third-party application to perform actions on behalf of the user; in response to receiving the request and based on the access token, transforming, by the authorization server, the access token into a single sign on (SSO) link with a session token; and transmitting, by the authorization server, the SSO link with the session token to the third-party application developed by the third-party, the SSO link causing the third-party application to redirect the user to the UX session corresponding to the SSO link.

In example 2, the subject matter of example 1 can optionally include wherein the access token comprises embedded permissions that define resources to be accessed and operations performable on the resources for the user and the third-party application, the method further comprising mapping the embedded permissions to UX permissions.

In example 3, the subject matter of any of examples 1-2 can optionally include wherein transforming the access token into the SSO link with the session token comprises encapsulating the UX permissions within the session token.

In example 4, the subject matter of any of examples 1-3 can optionally include wherein the UX session is based on the UX permissions, the UX session providing access to a user interface or service authorized by the UX permission.

In example 5, the subject matter of any of examples 1-4 can optionally include wherein the transforming eliminates a second factor authentication to access the UX session.

In example 6, the subject matter of any of examples 1-5 can optionally include wherein transforming the access token into the SSO link comprises transforming the access token into a SSO Uniform Resource Locator (URL).

In example 7, the subject matter of any of examples 1-6 can optionally include receiving an indication from the user to end the UX session; and responsive to receiving the indication, redirecting the user back to the third-party application.

In example 8, the subject matter of any of examples 1-7 can optionally include wherein the access token previously granted by the authorization server is an API authorization granted in response to an Open Authorization (OAuth) process.

Example 9 is a system for transforming an API authorization to a UX session without a second user sign in. The system includes one or more hardware processors and a storage device storing instructions that, when executed by the one or more hardware processors, causes the one or more hardware processors to perform operations comprising receiving, from a third-party application developed and hosted by a third-party, a request to access a user experience (UX) session on behalf of a user, the request comprising an access token previously granted to the third-party application in response to consent, by the user, to allow the third-party application to perform actions on behalf of the user; in response to receiving the request and based on the access token, transforming the access token into a single sign on (SSO) link with a session token; and transmitting the SSO link with the session token to the third-party application developed by the third-party, the SSO link causing the third-party application to redirect the user to the UX session corresponding to the SSO link.

In example 10, the subject matter of example 9 can optionally include wherein the access token comprises embedded permissions that define resources to be accessed and operations performable on the resources for the user and the third-party application, the method further comprising mapping the embedded permissions to UX permissions.

In example 11 the subject matter of any of examples 9-10 can optionally include wherein transforming the access token into the SSO link with the session token comprises encapsulating the UX permissions within the session token.

In example 12, the subject matter of any of examples 9-11 can optionally include wherein the UX session is based on the UX permissions, the UX session providing access to a user interface or service authorized by the UX permission.

In example 13, the subject matter of any of examples 10-12 can optionally include wherein transforming the access token into the SSO link comprises transforming the access token into a SSO Uniform Resource Locator (URL).

In example 14, the subject matter of any of examples 9-13 can optionally include receiving an indication from the user to end the UX session; and responsive to receiving the indication, redirecting the user back to the third-party application.

Example 15 is a machine-storage medium for transforming an API authorization to a UX session without a second user sign in. The machine-storage medium configures one or more processors to perform operations comprising receiving, at an authorization server from a third-party application developed and hosted by a third-party, a request to access a user experience (UX) session on behalf of a user, the request comprising an access token previously granted by the authorization server to the third-party application in response to consent, by the user, to allow the third-party application to perform actions on behalf of the user; in response to receiving the request and based on the access token, transforming, by the authorization server, the access token into a single sign on (SSO) link with a session token; and transmitting, by the authorization server, the SSO link with the session token to the third-party application developed by the third-party, the SSO link causing the third-party application to redirect the user to the UX session corresponding to the SSO link.

In example 16, the subject matter of example 15 can optionally include wherein the access token comprises embedded permissions that define resources to be accessed and operations performable on the resources for the user and the third-party application, the method further comprising mapping the embedded permissions to UX permissions.

In example 17, the subject matter of any of examples 15-16 can optionally include wherein transforming the access token into the SSO link with the session token comprises encapsulating the UX permissions within the session token.

In example 18, the subject matter of any of examples 15-17 can optionally include wherein the UX session is based on the UX permissions, the UX session providing access to a user interface or service authorized by the UX permission.

In example 19, the subject matter of any of examples 15-18 can optionally include wherein transforming the access token into the SSO link comprises transforming the access token into a SSO Uniform Resource Locator (URL).

In example 20, the subject matter of any of examples 15-19 can optionally include receiving an indication from the user to end the UX session; and responsive to receiving the indication, redirecting the user back to the third-party application.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject flatter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving, at a networked system comprising one or more authorization servers, a first request for a user experience (UX) session to access resources of the networked system, the first request transmitted by a third-party application on behalf of a user device based on an initial sign-on at the one or more authorization servers;
    providing, from the networked system to the third-party application, an access token comprising embedded permissions that define the resources of the networked system to be accessed by the third-party application;
    receiving, from the third-party application, a second request to transform the access token into a single sign on (SSO) link, the second request based on an operation not supported by the third-party application;
    in response to receiving the second request, transforming, by the networked system, the access token into the SSO link comprising a session token having embedded UX session permissions mapped to the access token, the SSO link configured to grant the user device permission to access the UX session to use the resources of the networked system via the third-party application without an additional sign-on by the user device at the one or more authorization servers; and
    transmitting, by the networked system, the SSO link comprising the session token to the third-party application.

2. The method of claim 1, wherein transforming the access token into the SSO link comprises passing the access token through an authorization request header and applying a format.

3. The method of claim 1, wherein the user device accesses, via the third-party application, the resources of the networked system comprising access to a user interface or service authorized by the UX session permissions subsequent to the transmission of the SSO link.

4. The method of claim 1, wherein the transforming eliminates a second factor authentication to access the UX session.

5. The method of claim 1, wherein transforming the access token into the SSO link comprises transforming the access token into a SSO Uniform Resource Locator (URL).

6. The method of claim 1, further comprising:
    receiving an indication from the user device to end the UX session; and
    responsive to receiving the indication, redirecting the user device back to the third-party application.

7. The method of claim 1, wherein the access token is an API authorization granted in response to an Open Authorization (OAuth) process.

8. The method of claim 1, further comprising providing, to the third-party application, access to one of the resources of the networked system subsequent to transmitting the SSO link.

9. A system comprising:
one or more hardware processors; and
a storage device storing instructions that, when executed by the one or more hardware processors, causes the one or more hardware processors to perform operations comprising:
receiving, at a networked system comprising one or more authorization servers, a request for a user experience (UX) session to access resources of the networked system, the request transmitted by a third-party application on behalf of a user device based on a consent, by the user device, to allow the third-party application to perform actions on behalf of the user device;
in response to receiving the request, transforming an access token comprising embedded permissions that define the resources of the networked system to be accessed by the third-party application, into a single sign on (SSO) link with a session token having embedded UX session permissions mapped to the access token, the SSO link configured to grant the third-party application permission to access the UX session to use the resources of the networked system without additional consent by the user device at the one or more authorization servers; and
transmitting, by the networked system, the SSO link with the session token to the third-party application.

10. The system of claim 9, wherein transforming the access token into the SSO link with the session token comprises encapsulating the UX session permissions within the session token.

11. The system of claim 9, further comprising granting the user device access to the resources via the third-party application in response to transmitting the SSO link, wherein the user device accesses the resources via the UX session is based on the UX session permissions, the UX session providing access to a user interface or service authorized by the UX session permissions.

12. The system of claim 9, wherein transforming the access token into the SSO link comprises transforming the access token into a SSO Uniform Resource Locator (URL).

13. The system of claim 9, wherein the operations further comprise:
receiving an indication from the user device to end the UX session; and
responsive to receiving the indication, redirecting the user device back to the third-party application.

14. The system of claim 9, wherein transforming the access token into the SSO link comprises transforming the access token into an internal access token and obtaining an internal service response from the networked system.

15. A machine-readable storage medium storing instructions that, when executed by one or more processors of a machine, cause the one or more processors to perform operations comprising:
receiving, at a networked system comprising an authorization server, a request for a user experience (UX) session to access resources of the networked system, the request transmitted by a third-party application on behalf of a user device and based on an initial sign-on at the authorization server;
in response to receiving the request, transforming, by the networked system, an access token, comprising embedded permissions that define the resources of the networked system, into a single sign on (SSO) link with a session token having embedded UX session permissions mapped to the access token, the SSO link configured to grant the user device permission to access the UX session to use the resources of the networked system via the third-party application without an additional sign-on by the user device at the authorization server; and
transmitting, by the networked system, the SSO link with the session token to the third-party application.

16. The machine-readable storage medium of claim 15, wherein transforming the access token into the SSO link with the session token comprises encapsulating the UX session permissions within the session token.

17. The machine-readable storage medium of claim 15, further comprising granting the user device access to the resources via the third-party application in response to transmitting the SSO link, wherein the user device accesses the resources via the third-party application, the UX session providing access to a user interface or service authorized by the UX session permissions.

18. The machine-readable storage medium of claim 15, wherein transforming the access token into the SSO link comprises transforming the access token into a SSO Uniform Resource Locator (URL).

19. The machine-readable storage medium of claim 15, wherein the operations further comprise:
receiving an indication from the user device to end the UX session; and
responsive to receiving the indication, redirecting the user device back to the third-party application.

20. The machine-readable storage medium of claim 15, wherein the transforming eliminates a second factor authentication to access the UX session.

* * * * *